Inventor:
Frederick James Smith
by Rauber + Lazar
attorneys

United States Patent Office 3,492,180
Patented Jan. 27, 1970

3,492,180
METHOD OF RETREADING PNEUMATIC TYRES AND MOULDING APPARATUS USED THEREFOR
Frederick James Smith, Erdington, Birmingham, England, assignor to Dunlop Rubber Company Limited, London, England, a British company
Filed July 20, 1966, Ser. No. 569,004
Claims priority, application Great Britain, July 28, 1965, 32,156/65
Int. Cl. B29h 17/37
U.S. Cl. 156—96        4 Claims

ABSTRACT OF THE DISCLOSURE

The retreading of a pneumatic tyre comprising removing the worn tread rubber and thereafter applying new unvulcanized tread rubber, placing the tyre in a vulcanizing mould and preventing engravings therefrom on the tyre by an annular masking band in position between the side wall of the tyre and the corresponding portion of the mould.

---

This invention relates to the manufacture of pneumatic tyres.

In the process of remoulding tyres the worn tyre is first prepared by buffing away the original rubber tread and sidewalls to leave the original carcass, applying new rubber tread and sidewalls to the carcass and placing the tyre in a vulcanising mould and heating the mould to vulcanise the rubber and form the tread and sidewalls with a desired pattern. Frequently the tyre is moulded in the same mould as used in the curing and moulding of the pneumatic tyre when it was first manufactured.

However, with many tyres the rubber of the sidewalls is not worn sufficiently to require renewal. In such cases it would be preferable to retread the tyres by removing and replacing only the worn tread and shoulder rubber. However, if such tyres are retreaded in the original mould a duplicate set of engraving markings is imprinted on the original vulcanised rubber of the sidewall.

According to the present invention a method of retreading a pneumatic tyre comprises removing the worn tread rubber, applying a new unvulcanised tread rubber, locating the tyre in a vulcanising mould having engravings on at least one sidewall forming portion thereof with at least one annular masking band in position between the sidewall portion of the tyre and the sidewall forming portion of the mould, and heating the mould to cure and mould the tread portion of the tyre.

Also, according to the invention apparatus for retreading a pneumatic tyre comprises a vulcanising mould having engravings on at least one sidewall forming portion thereof and at least one annular masking band locatable against the said sidewall forming portion of the mould.

Preferably each masking band comprises a thin annular ring of rigid material and vulcanised rubber ring covering a face thereof.

The invention also includes a pneumatic tyre in the manufacture of which a method or apparatus as defined above is used.

One embodiment of the invention will now be described, by way of example, with reference to the accompanying drawings in which.

Figures 1, 2:
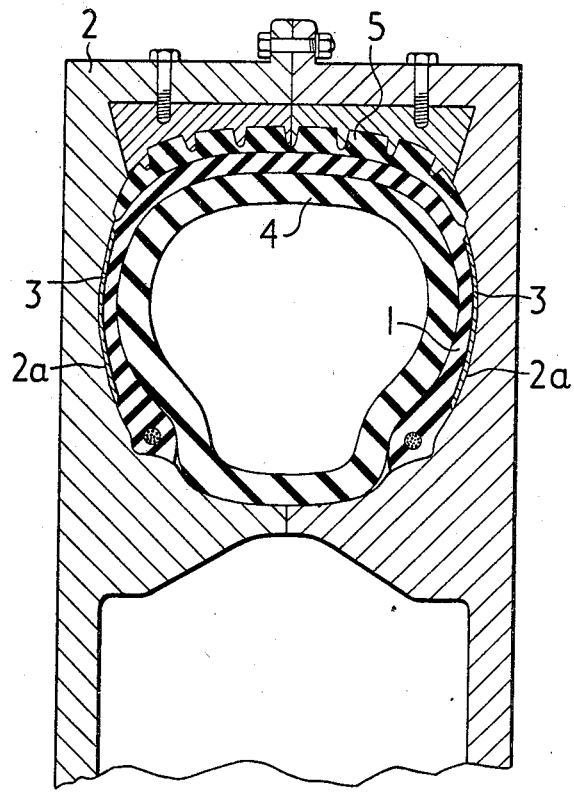
FIGURE 1 is sectional view of apparatus according to the invention.
FIGURE 2 is a scrap perspective view on a larger scale of part of the apparatus of FIGURE 1.

An aircraft pneumatic tyre 1 having a worn tread region but otherwise in good condition is retreaded with a tread pattern identical to that of the original tyre in the original mould 2 which has engravings on the sidewall forming portion 2a thereof.

The tyre is mounted in a buffing machine and the worn tread and shoulder regions buffed away and the buffed surfaces solutioned with a naphtha-based solution. A length of fresh camelback 5, i.e. unvulcanised tread rubber, extruded to the correct width and weight requirements is wrapped around the crown portion of the tyre at which stage the tyre is ready for retreading.

A pair of annular masking bands 3 is located one in each half of the tyre mould. Each band (a part of one of which is shown in FIGURE 2) consists of a 0.040″ thick rigid steel ring 3a backed with a 0.060″ thick vulcanised rubber ring 3b attached thereto. The radially inner and outer edges of the band are chamfered, the steel ring having a smaller median diameter than the median diameter of the rubber ring. The external diameter of the band is equal to the external diameter of the unbuffed portion of the tyre and the internal diameter of the band is equal to the internal diameter of the mould at the top of the bead clinch. A band 3 is located against each sidewall forming portion 2a of the mould with the vulcanised rubber ring 3b in contact with the mould surface and masking the engravings.

The prepared tyre is inserted in the mould with the metal rings in contact with the sidewalls of the tyre and the tyre inflated, by inflating an air bag 4, and moulded and vulcanised in conventional manner.

During this curing process the bands prevent the rubber of the sidewalls entering the engravings in the mould sidewall forming portion and the formation of a second set of engraving markings on the sidewall.

The rubber backing ring also prevents the metal ring being deformed into the engravings and engraving markings being introduced indirectly on the tyre sidewall. The vulcanised rubber ring which is a low heat conductive material also reduces the transference of heat to the sidewall of the tyre and reduces the amount of additional cure of the sidewall.

It is necessary to keep the thickness of the bands small otherwise steps of a significant size will be formed between the shoulder regions and the sidewalls.

The present invention provides a way of reducing the cost of remoulding tyres by reducing the cost of material required and enabling the original 'new cover' moulds to be used, thus reducing the number of moulds required and reducing operating costs by providing flexibility of operation of tyre moulding and vulcanising machines.

In a modification of the invention described above a rigid ring of plastic material is used instead of the masking band described.

Having now described my invention, what I claim is:
1. A method of retreading a pneumatic tyre comprising removing the worn tread rubber, applying a new unvulcanised tread rubber, locating the tyre in a vulcanising mould having engravings on at least one sidewall forming portion thereof with at least one annular masking band in position between the sidewall portion of the tyre and the sidewall forming portion of the mould, and heating the mould to cure and mould the tread portion of the tyre.

2. Apparatus for retreading a pneumatic tyre comprising a vulcanising mould having engravings on at least one sidewall forming portion thereof and at least one annular masking band locatable against the said sidewall forming portion of the mould.

3. Apparatus according to claim 2 wherein the said masking band comprises a thin annular ring of rigid material and a vulcanised rubber ring covering a face thereof.

4. Apparatus according to claim 3 wherein the said rigid material is metal.

References Cited

UNITED STATES PATENTS

| | | | |
|---|---|---|---|
| 1,989,646 | 1/1935 | Tuttle | 18—44 |
| 2,673,371 | 3/1954 | Uhlig | 264—338 X |
| 2,679,663 | 6/1954 | Schwemler et al. | 18—44 X |
| 2,836,854 | 6/1958 | Hawkinson | 18—44 |
| 3,380,121 | 4/1968 | Chittenden et al. | 18—44 X |
| 3,427,213 | 2/1969 | Alderfer | 156—245 X |

HAROLD ANSHER, Primary Examiner

U.S. Cl. X.R.

18—18, 42, 44, 38; 156—128, 245, 500; 249—104; 264—36, 248, 263, 266, 326, 338